United States Patent [19]
Parmley, Sr.

[11] Patent Number: 5,452,983
[45] Date of Patent: Sep. 26, 1995

[54] APPARATUS AND METHOD FOR REPLACING A BATTERY PACK IN A BATTERY POWERED VEHICLE

[76] Inventor: Daniel W. Parmley, Sr., 129 E. Citation, Tempe, Ariz. 85284

[21] Appl. No.: 199,759
[22] Filed: Feb. 22, 1994
[51] Int. Cl.⁶ .................................................. B60S 5/06
[52] U.S. Cl. .......................... 414/345; 414/396; 414/401; 414/676
[58] Field of Search ............................ 414/281, 390–391, 414/396, 399, 401–402, 676, 343, 345, 340, 347; 104/34; 180/117, 125

[56] References Cited

U.S. PATENT DOCUMENTS

| | | | |
|---|---|---|---|
| 434,579 | 8/1890 | Corning | 104/34 |
| 2,711,835 | 6/1955 | Kappen | 414/401 |
| 3,828,884 | 8/1974 | Burdick | 414/676 X |
| 4,120,411 | 10/1978 | Johnson | 104/34 X |
| 4,172,506 | 10/1979 | Terry | 414/676 X |
| 4,199,290 | 4/1980 | Jacoby | 414/401 X |
| 4,277,463 | 10/1980 | Pfleger | 414/347 X |
| 4,334,819 | 6/1982 | Hammerslag | 414/399 X |
| 4,450,400 | 5/1984 | Gwyn | 414/281 X |
| 4,470,578 | 9/1984 | Arvidsson et al. | 180/125 X |
| 4,808,058 | 2/1989 | Carney et al. | 414/396 X |
| 5,082,415 | 1/1992 | Hayashi | 414/343 |
| 5,129,778 | 7/1992 | Harp | 180/125 X |
| 5,187,423 | 2/1993 | Marton | 414/281 X |
| 5,308,218 | 5/1994 | Kobayashi et al. | 180/125 X |
| 5,360,307 | 11/1994 | Schemm et al. | 414/345 X |

Primary Examiner—Michael S. Huppert
Assistant Examiner—James W. Keenan
Attorney, Agent, or Firm—Harry M. Weiss; Jeffrey D. Moy; A. J. Moss

[57] ABSTRACT

An apparatus stores battery packs for battery powered vehicles, and provides a fast and easy way to change a discharged battery pack for a fresh battery pack. The vehicle is backed up to the platform of the apparatus, and a bridge piece spans the gap between the platform and the vehicle. The operator then uses a pneumatic forklift to lift the battery pack in the vehicle on a cushion of air. This allows the operator to easily move the battery pack from the vehicle, across the bridge piece, and across the platform of the apparatus to a storage location. The operator can then use the pneumatic forklift to move a fresh battery pack from a different storage location to the vehicle.

16 Claims, 4 Drawing Sheets

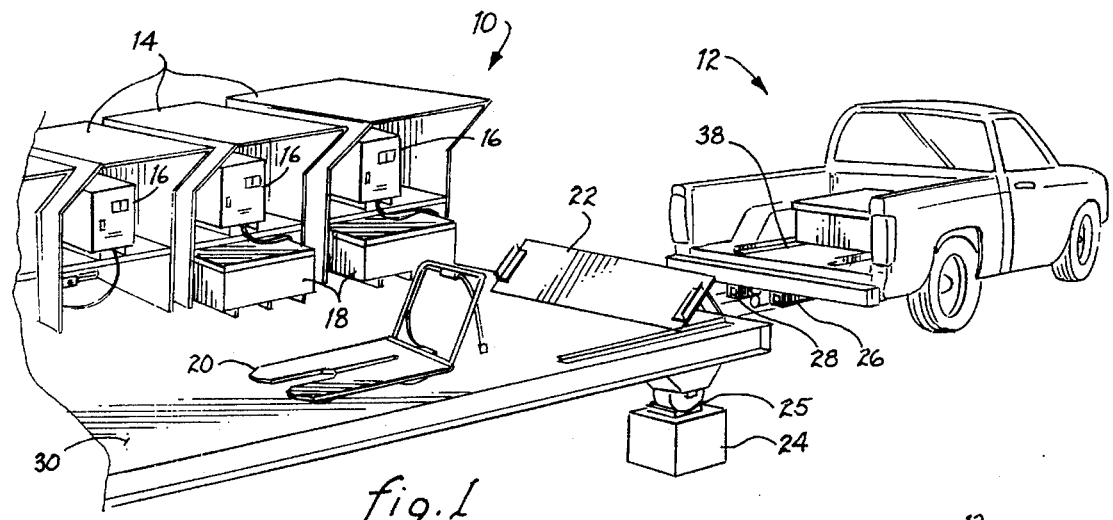
fig. 1
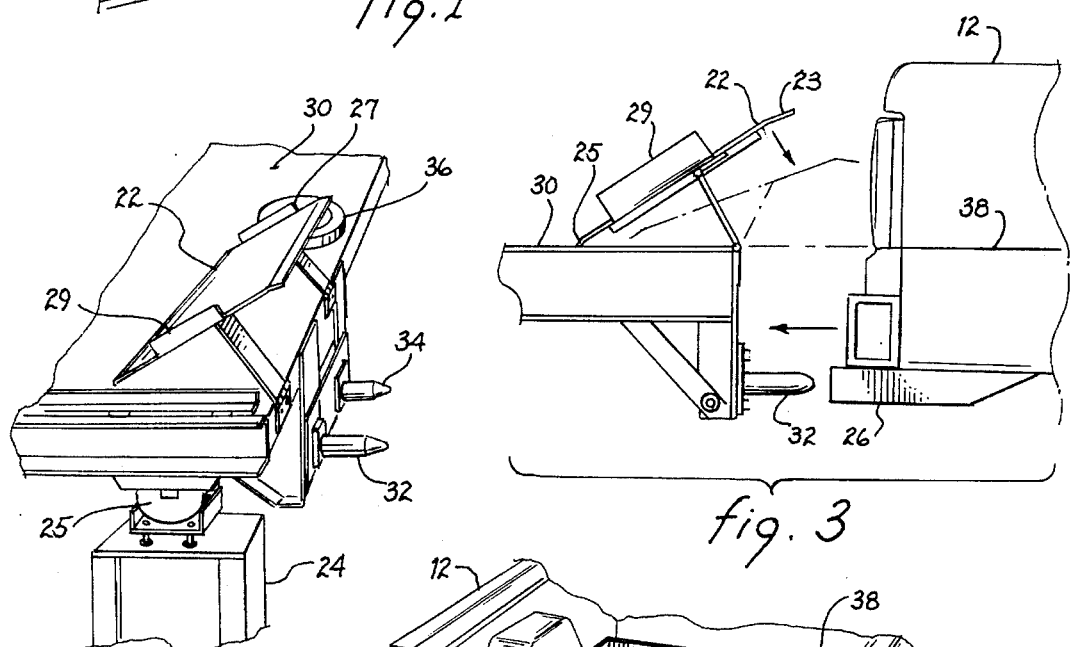
fig. 2
fig. 3
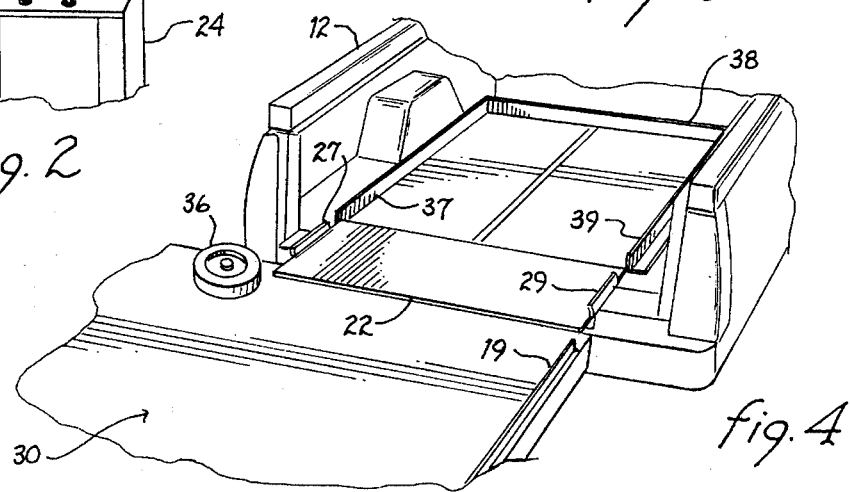
fig. 4

APPARATUS AND METHOD FOR REPLACING A BATTERY PACK IN A BATTERY POWERED VEHICLE

BACKGROUND OF THE INVENTION

1. Field of the Invention

This invention generally relates to battery powered vehicles, and, more specifically, relates to an apparatus and method for replacing a large battery pack in a battery powered vehicle.

2. Description of the Related Art

Battery packs for battery powered vehicles are very large and heavy, typically weighing 1500 lbs or more. The prior art systems for replacing these battery packs use a chainfall or block and tackle hoist arrangement. The hoist is connected to the discharged battery pack within the vehicle, the battery pack is lifted out of the vehicle, and the hoist is moved to a position to off load the discharged battery pack. The hoist is then moved to a position where a fresh battery pack is stored, the hoist is connected to this fresh battery pack, the fresh battery pack is lifted by the hoist, the hoist is moved to the waiting vehicle, and the battery pack is lowered into place. This operation is time-consuming and requires a great deal of skill and effort of the operator changing the battery packs.

An alternative system of the prior art has been used which uses a hoist in conjunction with a roll off dolly. A roll off dolly has wheels at the base for easy rolling, and has one or more belts or rollers on the top platform to allow an item to be easily moved to and from the dolly. The discharged battery pack in the vehicle is slid out of the vehicle onto the top platform of the roll off dolly. The dolly is then wheeled to the off load area, and the battery pack is lifted with a hoist off the roll off dolly and placed in a location for charging. A hoist is then used to lift a fresh battery pack and place it on top of the roll off dolly. The dolly is then wheeled to the vehicle, and the battery pack is then slid from the dolly into the vehicle.

The use of either of these prior art systems for loading and unloading a battery pack into and out of a battery powered vehicle is time-consuming, and requires a great deal of assistance and effort from the operator.

Therefore, there existed a need to provide an apparatus and method for quickly removing a used battery pack from a battery operated vehicle, and for installing a fresh battery pack into the vehicle in a very short time period, and with little effort by the operator.

SUMMARY OF THE INVENTION

According to the present invention, an apparatus and method for replacing a battery pack in a battery powered vehicle allows replacement of the battery pack without using cumbersome hoist arrangements of the prior art. The apparatus has a flat platform deck positioned at the same height as a battery holding platform on the battery powered vehicle. Located on the flat platform deck are a number of storage locations for battery packs. At one end of the platform, a bridge piece is provided to bridge the gap between the flat platform deck and the battery holding platform on the battery powered vehicle. A pneumatic carrier is provided to move the battery packs between the storage locations on the flat platform deck and into the battery holding platform on the battery powered vehicle.

The method in accordance with the present invention involves the steps of providing the apparatus of the present invention; moving the pneumatic carrier underneath the battery pack in the battery powered vehicle; activating the air flow to the pneumatic carrier causing the battery pack to be lifted; moving the battery pack on the pneumatic carrier across the battery holding platform, across the bridge piece, and across the flat platform deck to a storage location; shutting off the air flow to the pneumatic carrier causing the battery pack to be lowered into place at the storage location; and removing the pneumatic carrier from the battery pack. A fresh battery pack is then moved from a storage location to the battery holding platform of the battery powered vehicle using the pneumatic carrier described above.

The foregoing and other features and advantages will be apparent from the following description of the preferred exemplary embodiment of the invention as illustrated in the accompanying drawings.

BRIEF DESCRIPTION OF THE DRAWINGS

The preferred exemplary embodiment of the present invention will hereinafter be described in conjunction with the appended drawings, where like designations denote like elements, and:

FIG. 1 is a perspective view of the apparatus in accordance with the present invention when used in conjunction with a battery powered vehicle.

FIG. 2 is a partial perspective view of a portion of the apparatus of FIG. 1 showing how the apparatus is aligned and coupled to the battery powered vehicle.

FIG. 3 is a side elevational view of the portion of the apparatus of FIG. 2 showing the alignment of the battery powered vehicle to the apparatus, and showing the operation of the bridge between the apparatus and the battery powered vehicle.

FIG. 4 is a perspective view of the portion of the apparatus of FIGS. 2 and 3 when the bridge between the apparatus and the battery powered vehicle is properly in place.

DETAILED DESCRIPTION OF A PREFERRED EXEMPLARY EMBODIMENT

Figure 5:
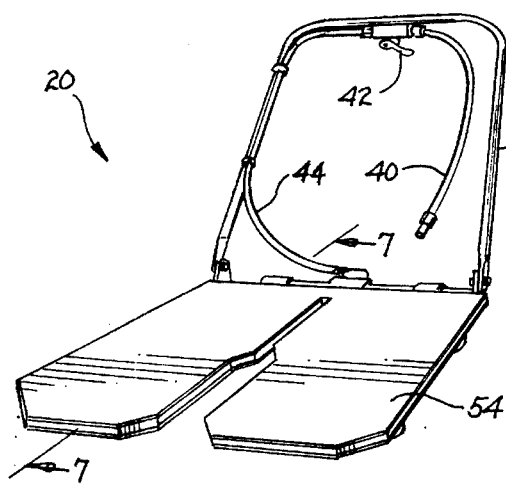
FIG. 5 is a perspective view of the pneumatic carrier shown in FIG. 1.

Referring to the figures, FIG. 1 shows a general view of the battery replacement apparatus 10 (hereinafter "apparatus"), as used to load a battery pack 18 into a battery powered vehicle 12 (hereinafter "vehicle"). Each battery pack 18 typically weighs about 1500 lbs, and comprises 20 large 6 volt batteries connected in series to provide a 120 volt power source. Apparatus 10 comprises multiple storage locations 14 as shown on a flat platform deck 30, which is nominally constructed of flat steel plate. Each storage location 14 is nominally equipped with a charger 16, and a space to store a battery pack 18, as shown. Note that the preferred exemplary embodiment as shown in FIG. 1 has a charger 16 at each storage location 14, but charger 16 could also be located outside of apparatus 10, with cables running to the appropriate storage location 14. A pneumatic carrier 20 is provided to shuttle battery packs 18 between their respective storage locations 14 and vehicle 12. Battery pack 18 has a pallet-type base portion as shown, to allow pneumatic carrier 20 to slide underneath battery pack 18.

A bridge piece 22 is provided to bridge the gap between flat platform deck 30 of apparatus 10 and battery holding platform 38 of vehicle 12, as shown in FIGS. 2–4. Bridge piece 22 is coupled to flat platform deck 30 as shown, and is placed in the position shown in FIG. 2 when vehicle 12 is not being loaded or unloaded with battery pack 18. Aligning pins 32 and 34 are coupled to flat platform deck 30 as shown, and provide a way to align vehicle 12 with flat platform deck 30, and to support vehicle 12 at a fixed height. As shown in FIG. 3, vehicle 12 backs up to flat platform deck 30, and guide pin 32 slides into guide pin receptacle 26, as shown, and guide pin 34 slides into guide pin receptacle 28 (not shown). Bridge piece 22 is then lowered as shown by the dashed lines in FIG. 3, to a position as shown in FIG. 4. Bridge piece 22 has a tapered front lip 25 which comes into contact with flat platform deck 30, and a tapered back lip 23 which comes into contact with battery holding platform 38 as shown in FIG. 3. Bridge piece 22 thus provides a continuous smooth surface between flat platform deck 30 and battery holding platform 38. Note that bridge piece 22 also has side guides 27 and 29 as shown in FIGS. 2 and 4.

As shown in FIG. 4, side guide 29 of bridge piece 22 bridges the gap between a guide rail 19 on flat platform deck 30 and a guide rail 39 on battery holding platform 38. In similar fashion, side guide 27 of bridge piece 22 bridges the gap between a guide roller 36 on flat platform 30 and a guide rail 37 on battery holding platform 38. In this manner the combination of side guides 27 and 29, guide rails 19, 37, and 39, and guide roller 36 serve to keep battery pack 18 in the proper alignment and position during loading and unloading.

Figure 12:
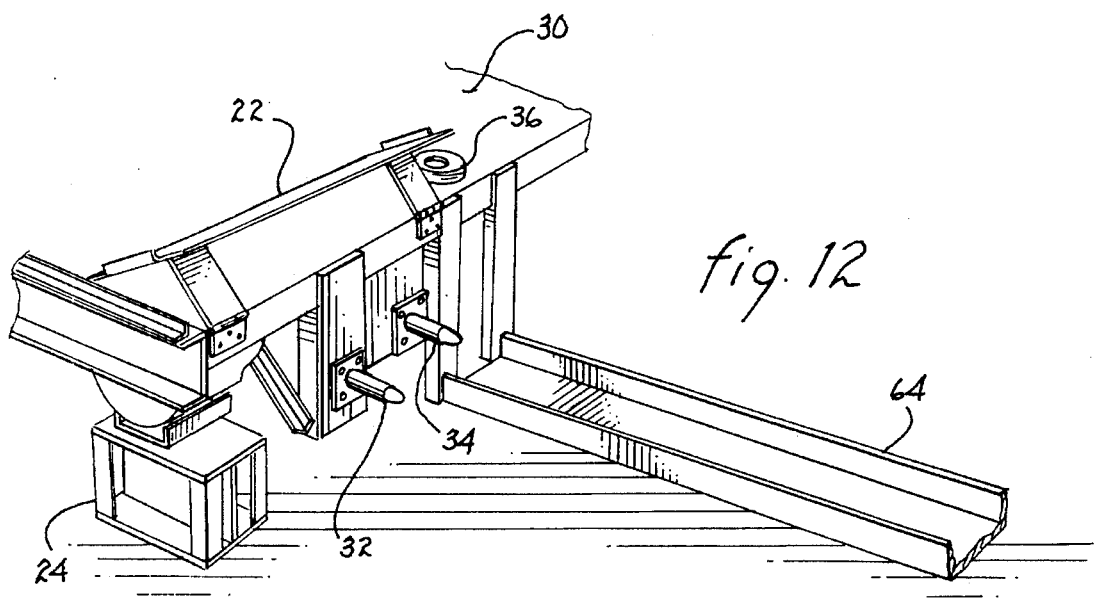
FIG. 12 is a perspective view of the wheel channel and guide pins that align the battery powered vehicle to the apparatus of FIG. 1.
Figure 13:
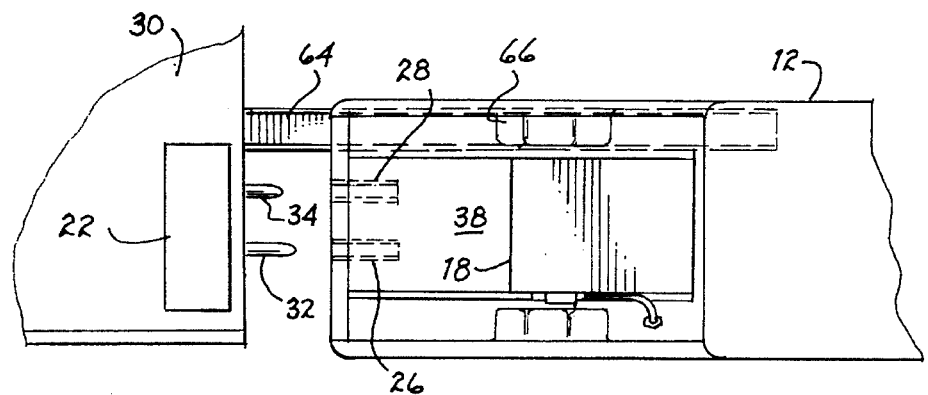
FIG. 13 is a top view of the wheel channel and guide pins of FIG. 12 showing the alignment of the battery powered vehicle to the apparatus of FIG. 1.

Guide pins 32 and 34 are shown in more detail in FIGS. 12 and 13, along with a wheel channel 64. Vehicle 12 backs up to flat platform deck 30, placing the left wheel 66 into wheel channel 64, as shown in FIG. 13. This placement of wheel 66 within wheel channel 64 assures that guide pins 32 and 34 are properly aligned with respective guide pin receptacles 26 and 28. As vehicle 12 backs up into position, these guide pins 32 and 34 slip inside respective guide pin receptacles 26 and 28. These guide pins serve not only to assure proper left/right alignment of vehicle 12 to flat platform deck 30, but also provide up/down structural support to vehicle 12 to keep battery holding platform 38 from rising when battery pack 18 is removed from vehicle 12. The use of two guide pins 32 and 34 holds battery holding platform 38 from rocking side to side, assuring a stable surface for loading and unloading the battery pack 18.

Pneumatic carrier 20 of FIG. 1 is shown in more detail in FIG. 5, and is more specifically characterized in this preferred exemplary embodiment as a pneumatic forklift. Pneumatic forklift 20 has a handle 52 coupled to a lifting surface 54. An air inlet host 40 is provided, which is coupled to a pneumatic valve 42. The outlet of pneumatic valve 42 goes to an output hose 44 as shown.

Figure 6:
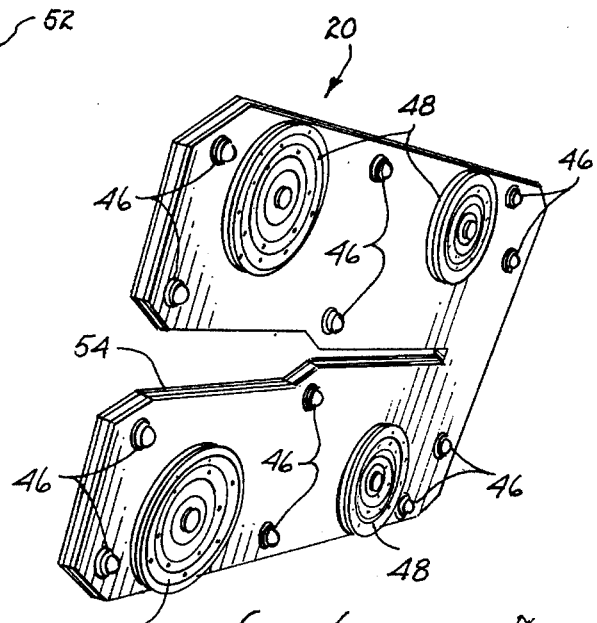
FIG. 6 is a bottom perspective view of the pneumatic carrier of FIG. 5.

FIG. 6 shows the configuration of the bottom of pneumatic forklift 20. Several ball bearing rollers 46 are provided at the bottom of lifting surface 54 as shown. In addition, four air bearings 48 are also provided on the bottom of lifting surface 54. Air bearings 48 are typically circular as shown, and have a diameter from four inches to ten inches depending on the weight of battery pack 18. In this preferred exemplary embodiment, ten inch air bearings from Airfloat provide the required lift. These air bearings 48 provide the required lift when connected to a source of compressed air at 125 psi that provides an air flow of 10 cubic feet per minute (CFM). Note, however, that the air pressure may be decreased from 125 psi to as low as 40 psi while still providing adequate lift by the air bearings.

Figure 7:
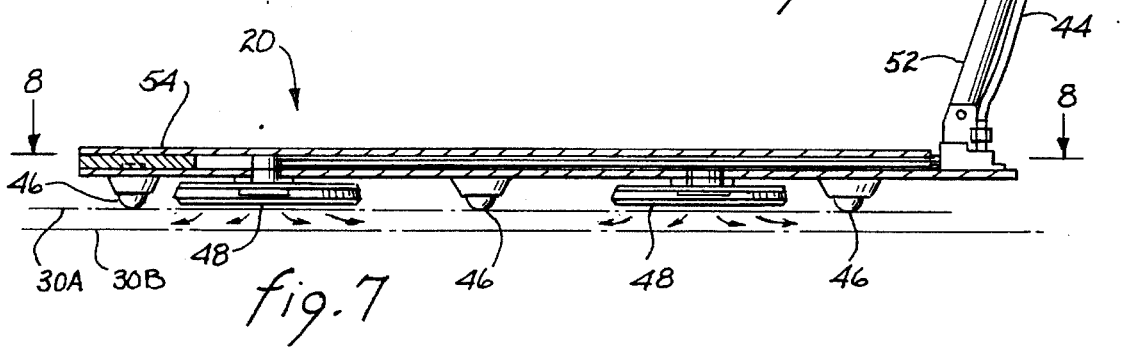
FIG. 7 is a cross-sectional view of the pneumatic carrier of FIG. 5 taken along the line 7—7, showing the function of the rollers and the air bearings.

The function of air bearings 48 is illustrated in FIG. 7. When there is no airflow through air bearings 48, lifting surface 54 simply rests on ball bearing rollers 46, which are in contact with flat platform deck in position 30A as shown. However, when air flow is provided to air bearings 48, the air pressure lifts lifting surface 54 off of ball bearing rollers 46, and causes lifting surface 54 to hover above flat platform deck in position 30B on a cushion of air. This lifting action is what causes pneumatic forklift 20 to pick up battery pack 18. With the air flow to air bearings 48, pneumatic forklift 20 may be moved about on flat platform deck 30 with ease, even when loaded down with battery pack 18.

Figure 8:
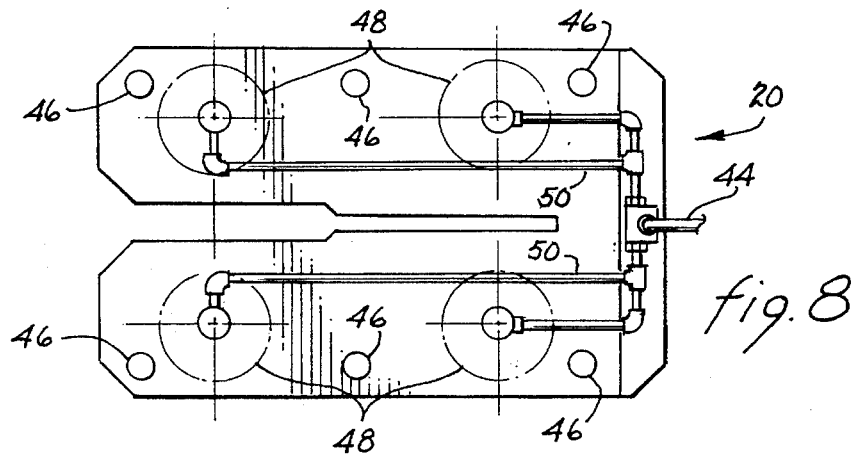
FIG. 8 is a top cross-sectional view of the pneumatic forklift of FIG. 7 taken along the line 8—8.

FIG. 8 shows the plumbing which provides air flow to all four air bearings 48. Outlet hose 44 is coupled to a network of pipes 50 which provide unrestricted air flow to air bearings 48 as shown.

Figure 9:
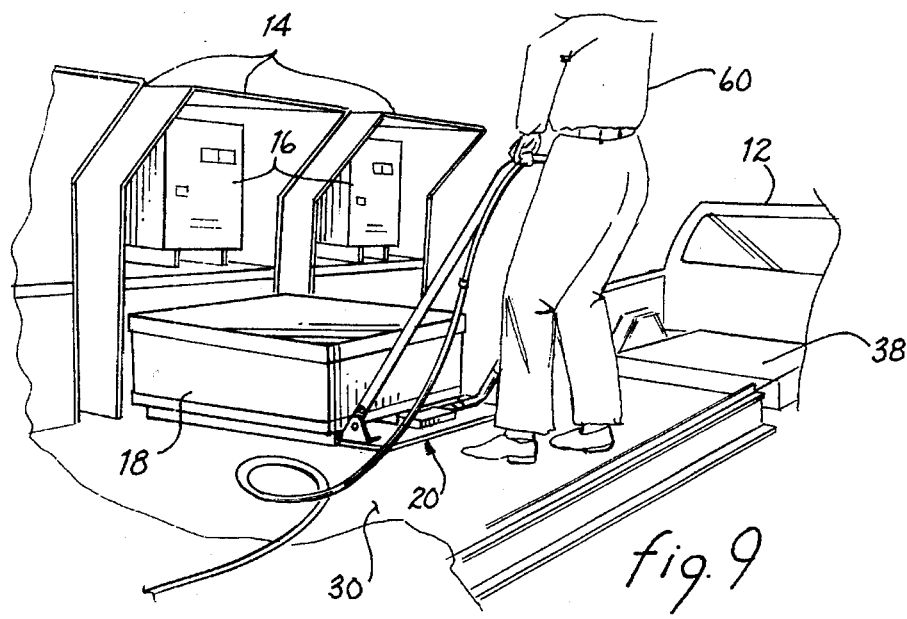
FIG. 9 is a perspective view of an operator using the pneumatic carrier of FIGS. 5–8 to move a battery pack.
Figure 10:
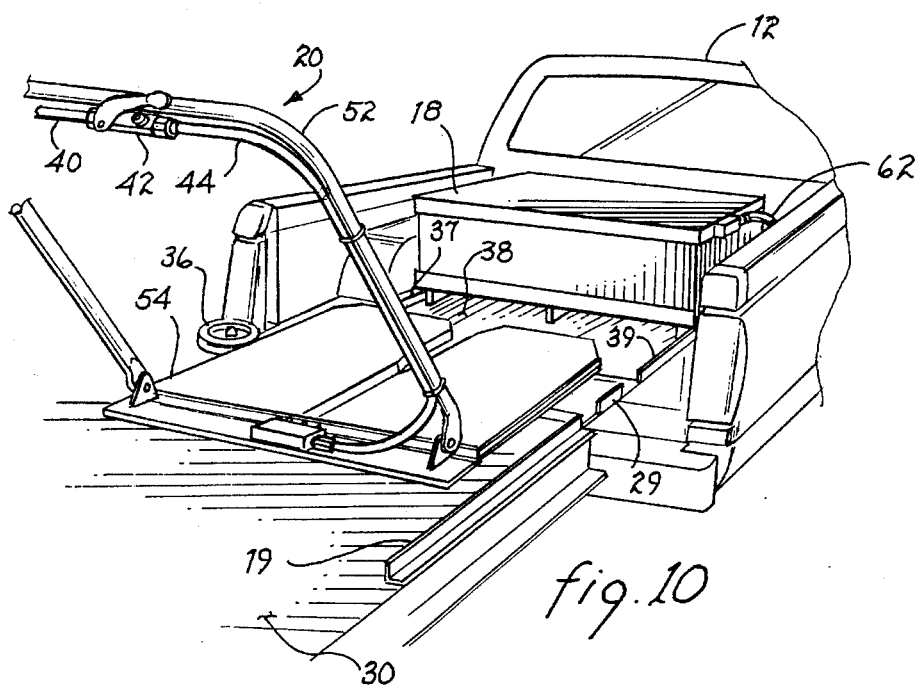
FIG. 10 is a perspective view showing the removal of the pneumatic carrier from the battery pack once the battery pack is installed into the battery powered vehicle.
Figure 11:
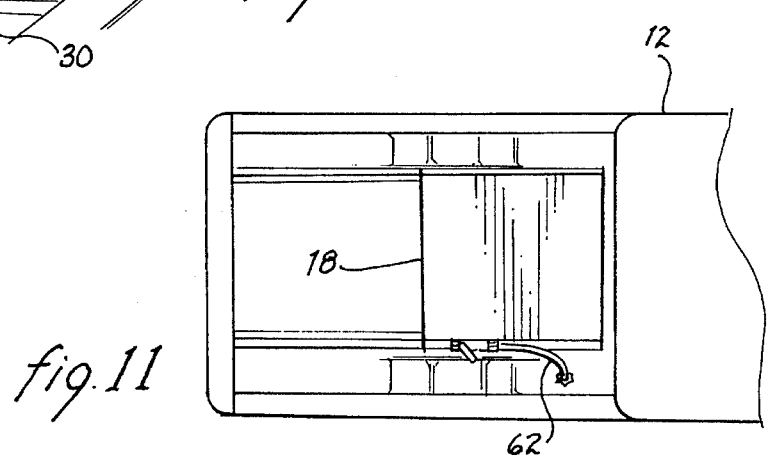
FIG. 11 is a top view of the battery powered vehicle with a battery pack installed.

Removal and installation of battery pack 18 into vehicle 12 is shown in FIGS. 9–11. FIG. 11 shows vehicle 12 with battery pack 18, which is initially assumed to be discharged and in need of replacement. Vehicle 12 backs up to apparatus 10 in the proper alignment (see FIG. 13), and bridge piece 22 is properly lowered into place (see FIG. 4). Power cable 62 is then disconnected from battery pack 18. As shown in FIG. 10, pneumatic forklift 20 is pushed underneath battery pack 18 within vehicle 12. An operator 60 then activates pneumatic valve 42, causing air to flow to air bearings 48 (see FIG. 7). The air flow lifts lifting surface 54 of pneumatic forklift 20 such that battery pack 18 is lifted off of battery holding platform 38 of vehicle 12, with the weight of battery pack 18 being supported on lifting surface 54 of pneumatic forklift 20, which is in turn supported by a cushion of air provided by air bearings 48. The ten inch air bearings 48 of the preferred exemplary embodiment nominally raise lifting surface 54 from ⅜ to ½ inch. Operator 60 then pulls pneumatic forklift 20 carrying battery pack 18 from vehicle 12 across bridge piece 22 onto flat platform deck 30. Operator 60 then rotates pneumatic forklift 20 to a position shown in FIG. 9, and pushes pneumatic forklift 20 until battery pack 18 is within an available storage location 14. Once battery pack 18 is in the proper position within storage location 14, operator 60 shuts off pneumatic valve 42, causing the air flow to air bearings 48 to cease. This causes lifting surface 54 of pneumatic forklift 20 to lower until ball bearing rollers 46 contact flat platform deck 30, which lowers lifting surface 54 to a level where pneumatic forklift 20 can be pulled free of battery pack 18. This completes the removal of the discharged battery pack 18. The next step is to install a fresh battery pack 18 into vehicle 12.

Operator 60 places pneumatic forklift 20 under a fresh battery pack 18 at a different storage location 14. Operator 60 activates pneumatic valve 42, which causes pneumatic forklift 20 to lift battery pack 18. Operator 60 then pulls battery pack 18 from storage location 14 to a position shown in FIG. 9. Operator 60 then rotates pneumatic forklift 20 so battery pack 18 faces battery holding platform 38 of vehicle 12. Operator 60 pushes pneumatic carrier 20 across bridge piece 22 and places battery pack 18 in the proper position within vehicle 12, as shown in FIG. 11. Operator 60 then shuts off pneumatic valve 42, causing pneumatic forklift 20 to lower until ball bearing rollers 46 contact battery holding platform 38. Operator 60 then pulls pneumatic forklift 20 from underneath battery pack 18 as shown in FIG. 10. Operator 62 then connects power cable 62 to battery pack 18 (see FIG. 11), and vehicle 12 is then ready for operation.

FIG. 10 clearly shows how guide roller 36, guide rail 19, side guide 29, and guide rail 39 provide a path or guide for pneumatic forklift 20. These guides, along with side guide 27 and guide rail 37 (as shown in FIG. 4) prevent pneumatic forklift 20 from sliding off of flat platform deck 30, and keep pneumatic forklift 20 aligned between the wheel wells of vehicle 12.

Figure 14:
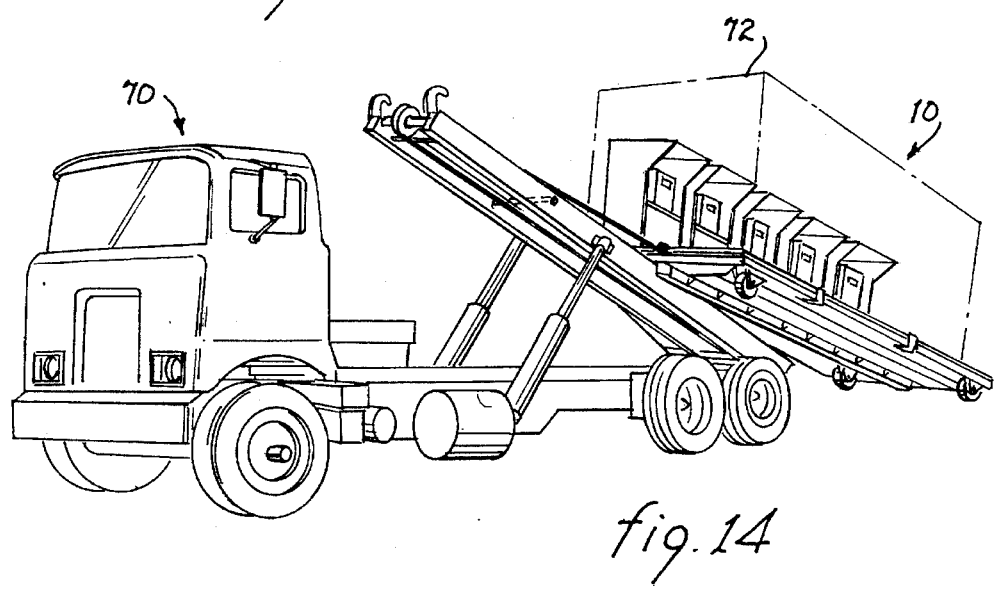
FIG. 14 is a perspective view showing the portability of the apparatus of FIG. 1 on a roll-off truck.

FIG. 14 shows how the apparatus of the present invention is portable when used in conjunction with a roll-off truck 70 as shown. Flat platform deck 30 is nominally 8 ft wide by 22 ft long, the same size as a large typical trash dumpster. Roll-off truck 70 is a truck which is normally used to transport this standard size of trash dumpster. Roll-off truck 70 can be used to transport apparatus 10, making apparatus 10 portable and very easy to transport from place to place. As shown in FIG. 1, when apparatus is unloaded from roll-off truck 70 (see FIG. 14), the wheels 25 of apparatus 10 are placed on blocks 24 at a height such that flat platform deck 30 is substantially level with battery holding platform 38 of vehicle 12.

For ease of transportation, apparatus 10 can also have an outer configuration as shown by the box 72 around apparatus 10 of FIG. 14. This box dimension is nominally 8 ft wide by 20 ft long by 8.5 ft high, which is the size of a standard ISO shipping container. The box is constructed according to ISO standards, to allow apparatus 10 to be easily transported by ship, by rail, by truck, or by other means as required.

The ease of transporting the apparatus of the present invention gives great flexibility in its use. It can be loaded onto a roll-off truck 70 as shown in FIG. 14, transported to another location, unloaded, leveled, and ready for operation in a matter of hours.

One of the most significant advantages of the apparatus and method of the present invention is the sheer speed of changing a discharged battery pack for a fresh battery pack. From the time that vehicle 12 is backed up and correctly alighted to apparatus 10, the discharged battery pack can be removed and a fresh battery pack can be installed in about four minutes, and without a great deal of skill or effort by the operator. The present invention thus stands in stark contrast to the battery replacement systems of the prior art which require significantly more time, skill and effort in replacing a discharged battery pack with a charged battery pack.

While the invention has been described in its preferred exemplary embodiment, it is to be understood that the words which have been used are words of description rather than limitation, and that changes may be made within the purview of the appended claims without departing from the true scope and spirit of the invention in its broader aspects. For example, apparatus 10 could be used to replace several battery packs in a single vehicle which is designed to hold multiple battery packs at one time.

What is claimed is:

1. An apparatus for replacing a battery pack in a battery powered vehicle comprising, in combination:

a flat platform deck positioned at substantially the same height as a battery holding platform on the battery powered vehicle;

at least one storage location for the battery pack on the flat platform deck;

bridge means for spanning a gap between the flat platform deck and the battery holding platform on the battery powered vehicle;

pneumatic carrier means using air for both lifting and moving the battery pack from the storage location across the flat platform deck and across the bridge means to the battery holding platform of the battery powered vehicle, and using air for both lifting and moving the battery pack from the battery holding platform of the battery powered vehicle across the bridge means and across the flat platform deck to the storage location;

guide means for aligning the battery powered vehicle to the flat platform deck; and wherein the guide means comprises at least one guide pin coupled to the flat platform deck and at least one corresponding guide pin receptacle coupled to the battery powered vehicle in a position where the guide pin goes inside the corresponding guide pin receptacle as the battery powered vehicle backs up to the flat platform deck when the battery powered vehicle is properly aligned with the flat platform deck.

2. The apparatus of claim 1 wherein the guide means further comprises wheel channel means for aligning the guide pin to the corresponding guide pin receptacle when a wheel of the battery powered vehicle is within the wheel channel means.

3. The apparatus of claim 1 further comprising roller means coupled to the flat platform deck for allowing the apparatus to be moved from one location to another by rolling the apparatus on the roller means.

4. The apparatus of claim 1 wherein the outer structure of the apparatus is constructed 8 feet wide, 20 feet long, and 8.5 feet high in a standard ISO container configuration to allow ease of shipping and transport.

5. The apparatus of claim 1 wherein the bridge means is coupled to the flat platform means.

6. The apparatus of claim 1 further comprising guide roller means coupled to the flat platform deck for guiding the battery pack from the flat platform deck onto the bridge means.

7. The apparatus of claim 1 wherein the pneumatic carrier means comprises a pneumatic forklift comprising, in combination:

a lifting surface;

a plurality of ball bearing rollers coupled to the lifting surface to roll the pneumatic forklift on the flat platform deck;

a plurality of air bearings coupled to the lifting surface such that air flow through the plurality of air bearings lifts the lifting surface to a position substantially parallel to and above the flat platform deck where the plurality of ball bearing rollers are nominally separated from the flat platform deck; and air flow means for providing a source of compressed air to the plurality of air bearings.

8. The apparatus of claim 7 wherein the pneumatic forklift further comprises a handle coupled to the lifting surface for allowing an operator to move the pneumatic forklift.

9. The apparatus of claim 7 wherein the air flow means comprises:

conduit means coupled to the plurality of air bearings for providing the source of compressed air to the plurality of air bearings;

a pneumatic valve coupled to the conduit means on one end, and coupled to the source of compressed air on the other end;

the pneumatic valve having a first position and a second position, the first position coupling the source of compressed air to the plurality of air bearings, and the second position disconnecting the source of compressed air from the plurality of air bearings.

10. The apparatus of claim 1 further comprising a battery charger located in each storage location.

11. The apparatus of claim 1 wherein the bridge means comprises a substantially flat center portion coupled to a downward tapered front lip which rests on the flat platform deck, the center portion also coupled to a downward tapered back lip which rests on the battery holding platform of the battery powered vehicle.

12. An apparatus for replacing a battery pack in a battery powered vehicle comprising, in combination:

a flat platform deck positioned at substantially the same height as a battery holding platform on the battery powered vehicle;

at least one storage location for the battery pack on the flat platform deck;

roller means coupled to the flat platform deck for allowing the apparatus to be moved from one location to another by rolling the apparatus on the roller means;

bridge means coupled to the flat platform deck for spanning a gap between the flat platform deck and the battery holding platform on the battery powered vehicle;

guide means for aligning the battery powered vehicle to the flat platform deck, the guide means comprising at least one guide pin coupled to the flat platform deck and at least one corresponding guide pin receptacle coupled to the battery powered vehicle in a position where the guide pin goes inside the corresponding guide pin receptacle as the battery powered vehicle backs up to the flat platform deck when the battery powered vehicle is properly aligned with the flat platform deck, the guide means further comprising wheel channel means for aligning the guide pin to the corresponding guide pin receptacle when a wheel of the battery powered vehicle is within the wheel channel means; and a pneumatic forklift using air for both lifting and moving the battery pack from the storage location across the flat platform deck and across the bridge means to the battery holding platform of the battery powered vehicle, and using air for both lifting and moving the battery pack from the battery holding platform of the battery powered vehicle across the bridge means and across the flat platform deck to the storage location, the pneumatic forklift comprising, in combination:

a lifting surface;

a handle coupled to the lifting surface for allowing an operator to move the pneumatic forklift;

a plurality of ball bearing rollers coupled to the lifting surface to roll the pneumatic forklift on the flat platform deck;

a plurality of air bearings coupled to the lifting surface such that air flow through the plurality of air bearings lifts the lifting surface to a position substantially parallel to and above the flat platform deck where the plurality of ball bearing rollers are nominally separated from the flat platform deck; and air flow means for providing a source of compressed air to the plurality of air bearings comprising, in combination:

conduit means coupled to the plurality of air bearings for providing the source of compressed air to the plurality of air bearings;

a pneumatic valve coupled to the conduit means on one end, and coupled to the source of compressed air on the other end;

the pneumatic valve having a first position and a second position, the first position coupling the source of compressed air to the plurality of air bearings, and the second position disconnecting the source of compressed air from the plurality of air bearings.

13. The apparatus of claim 12 wherein the outer structure of the apparatus is constructed 8 feet wide, 20 feet long, and 8.5 feet high in a standard ISO container configuration to allow ease of shipping and transport.

14. The apparatus of claim 12 further comprising guide roller means coupled to the flat platform deck for guiding the battery pack from the flat platform deck into the battery holding platform on the battery powered vehicle.

15. The apparatus of claim 12 further comprising a battery charger located in each storage location.

16. The apparatus of claim 12 wherein the bridge means comprises a substantially flat center portion coupled to a downward tapered front lip which rests on the flat platform deck, the center portion also coupled to a downward tapered back lip which rests on the battery holding platform of the battery powered vehicle.

* * * * *